United States Patent [19]
Okuchi

[11] Patent Number: 5,692,823
[45] Date of Patent: Dec. 2, 1997

[54] ILLUMINATING DEVICE

[75] Inventor: Hiroaki Okuchi, Anjo, Japan

[73] Assignee: Nippondenso Co., Ltd., Kariya, Japan

[21] Appl. No.: 570,495

[22] Filed: Dec. 11, 1995

[30] Foreign Application Priority Data

Jan. 31, 1995 [JP] Japan .................................. 7-14403

[51] Int. Cl.$^6$ ........................................................ F21V 8/00
[52] U.S. Cl. .......................... 362/32; 362/61; 362/32; 362/297; 362/307
[58] Field of Search ................................. 362/32, 31, 61, 362/80, 307, 298, 300, 301, 346, 311, 319, 320, 351, 355, 297; 385/31, 33, 901

[56] References Cited

U.S. PATENT DOCUMENTS

| 4,811,174 | 3/1989 | Kanzler et al. | |
| 5,365,412 | 11/1994 | Koppolu et al. | 362/32 |
| 5,499,166 | 3/1996 | Kato et al. | 362/32 |

FOREIGN PATENT DOCUMENTS

| 225313 | 6/1987 | European Pat. Off. . |
| 623780 | 11/1994 | European Pat. Off. . |
| 4320554 | 12/1993 | Germany . |

*Primary Examiner*—Thomas M. Sember
*Attorney, Agent, or Firm*—Cushman, Darby & Cushman IP Group of Pillsbury Madison & Sutro LLP

[57] ABSTRACT

A lens body for providing a flat light distribution has a pair of reflective surfaces inclined vertically and symmetrically and used as an illuminating device for a vehicle which does not cause glaring against the on-coming vehicles traveling on the opposite lane. Light entering from an incident surface is emitted from an outgoing surface after being reflected. Areas illuminated by the pair of reflective surfaces are formed having a substantially horizontal cut line CL at the right and left sides of an illuminated area by direct light emitted from the outgoing surface directly without being reflected on the reflective surfaces.

15 Claims, 4 Drawing Sheets

ILLUMINATING DEVICE

CROSS REFERENCE TO RELATED APPLICATION

This application is based upon and claims priority of Japanese Patent Application No. 7-14403 filed on Jan. 31, 1995, incorporated herein by reference.

BACKGROUND OF THE INVENTION

1. Field of the Invention

The present invention relates to an illuminating device, to be more precise, an illuminating device having a wide angle light distribution lens which provides a flat light distribution pattern in a horizontal direction.

2. Description of Related Art

An illuminating device for a vehicle disclosed in Japanese Patent Application Laid-Open Publication No. 6-68702 has a wide angle light distribution lens 1 as shown in FIG. 7. The wide angle light distribution lens 1 is composed of a light incident surface 11 where non-interrupted light by a shade (not shown) enters after traveling through an optical cable (not shown). Since incident light from the incident surface is reflected on a pair of reflective surfaces 12 and 13 formed to face each other and is emitted from a light outgoing surface 14, a horizontally flat light distribution pattern 2 can be produced. Illuminated areas 22, 23, 24 and 25 by reflection light reflected on the reflective surfaces 12 and 13 are formed at both right and left sides of an illuminated area 21 by direct light emitted directly from the outgoing surface 14 without being reflected on the reflective surfaces 12 and 13. In FIG. 7, numeral 31 represents an effective light incident area on the incident surface 11. Some incident light entering the incident area 31 is reflected once on one reflective surface 12 and is emitted from the outgoing surface 14. Numeral 32 represents a virtual light incident area of this reflection light reflected by the reflective surface 12, when the light emitted from the outgoing surface 14 is converted to straight light. Some incident light entering the incident area 31 is reflected once on the other reflective surface 13 and is emitted from the outgoing surface 14. Numeral 33 represents a virtual light incident area of this reflection light reflected by the reflective surface 13, when the light emitted from the outgoing surface 14 is converted to straight light. After some incident light entering the incident area 31 is reflected on one reflective surface 12, the incident light is reflected again on the other reflective surface 13. Numeral 34 represents a virtual light incident area of the reflection light, thus, reflected twice, when the light emitted from the outgoing surface 14 is converted to straight light. After some incident light entering the incident area 31 is reflected on one reflective surface 13, the incident light is reflected again on the other reflective surface 12. Numeral 35 represents a virtual incident area of the reflection light, thus reflected twice, when the light emitted from the outgoing surface 14 is converted to straight light. Lines H—H, V—V and CL represent a horizontal line, a vertical line, and a designed cut line, respectively. Numeral 21 is an illuminated area by the direct light as described above. Numeral 22 is an area designed to be illuminated by the incident light entering the virtual incident area 32. Numeral 23 is an area designed to be illuminated by the incident light entering the virtual incident area 33. Numeral 24 is an area designed to be illuminated by the incident light entering the virtual incident area 34. Numeral 25 is an area designed to be illuminated by the incident light entering the virtual incident area 35. In reality, some reflection light is reflected at least three times on the reflective surfaces 12 and 13 before being emitted from the outgoing surface 14; however, virtual light incident areas and areas illuminated by such reflection light are omitted and not shown in FIG. 7.

According to the conventional wide angle light distribution lens 1 as described above, aberration is caused in the reflection light. Therefore upwardly moved illuminated areas 22a, 23a, 24a, and 25a and downwardly moved illuminated areas 22b, 23b, 24b and 25b relative to the designed illuminated areas (dot-and-chain line) 22–25 are actually formed as shown in a light distribution pattern in FIG. 7. It has been found that the upwardly moved illuminated areas, more specifically, those 24a and 25a at right and left sides cause glaring against on-coming vehicles running on the opposite lane.

The inventor has studied the reason the illuminated areas by reflection light do not coincide with the designed illuminated areas but move upward and downward to form the upwardly moved illuminated areas 22a–25a and the downwardly moved illuminated areas 22b–25b. The inventor has concluded from his study the upwardly moved illuminated areas 22a–25a and the downwardly moved illuminated areas 22b–25b are created by the causes described below.

As shown in FIG. 8A which is a top plan view of a wide angle light distribution lens 1, some incident light entering the incident area 31 is not reflected on the reflective surfaces 12 and 13 but is directly emitted from the outgoing surface 14 as direct light. Since the direct light travels straight inside a wide angle light distribution lens 1, passage distance for the direct light to travel straight from the incident area 31 to the outgoing surface 14 corresponds approximately to a focal distance f, designed in advance, of the wide angle light distribution lens 1. For this reason, as shown in FIG. 8B which is a side plan view of the wide angle light distribution lens 1, direct light 41U emitted from the upper part of the outgoing surface 14 and direct light 41L emitted from the lower part of the outgoing surface 14 become horizontal light not to cause aberration in case the central axis 15 of the wide angle lens 1 is aligned with the upper end of the shade 4 to make the aberration minimum. As for reflection light emitted from the outgoing surface 14 after being reflected on either one or both of the reflective surfaces 12 and 13, the distance $f_1$ from the virtual incident areas 32–35 to the outgoing surface 14 becomes longer than designed focal distance f. Therefore, as shown in FIG. 8B, the reflection light 42U emitted from the upper part of the outgoing surface 14 will not become horizontal light like the direct light 41U emitted from the upper part of the outgoing surface 14 but is emitted downward. The reflection light 42L emitted from the lower part of the outgoing surface 14 will not become horizontal light like direct light 41L emitted from the lower part of the outgoing surface 14 but is emitted upward. The reflection light 42U emitted from the upper part of the outgoing surface 14 produces downwardly moved illuminated areas 22b–25b while the reflection light 42L emitted from the lower part of the outgoing surface 14 produces upwardly moved illuminated areas 22a–25a.

As shown in FIG. 8A, because a pair of reflective surfaces 12 and 13 is not parallel to each other in the horizontal direction and the angle in the horizontal direction is θ, the virtual incident areas 32–35 are positioned on a curved line protruding forward (to the right in FIG. 8A) as indicated by a dotted line; however, if the pair of reflective surfaces 12 and 13 is in parallel horizontally, the virtual incident areas 32–35 are positioned on a straight line. In case the pair of reflective surfaces 12 and 13 is parallel to each other horizontally, the distance $f_1$ from the virtual incident areas 32–35 to the outgoing surface 14 still becomes longer than the designed focal distance f, which causes upwardly and downwardly moved illuminated areas 22a–25a and 22b–25b.

SUMMARY OF THE INVENTION

The present invention has an object to attain a desired flat light distribution pattern.

The present invention has a further object to prevent upwardly moved illuminated areas from occurring and provide an illuminating device for a vehicle which will not cause glaring against on-coming vehicles running on the opposite lane.

According to the present invention, incident light from a light incident surface is reflected on a pair of reflective surfaces formed face to face and is emitted from a light outgoing surface.

Illuminated areas by reflection light reflected on the reflective surfaces are formed at right and left sides of an area illuminated by direct light emitted from the outgoing surface without being reflected on the reflective surfaces. The pair of reflective surfaces is formed not in parallel in a vertical direction. Therefore the areas illuminated by the reflection light, reflected on each inclined reflective surface, can be created at both right and left sides of the area illuminated by the direct light according to the inclined angle of each reflective surface, so that a desired illumination pattern can be formed.

Preferably, the pair of reflective surfaces is symmetrical relative to a vertical plane. Therefore virtual light incident areas of the reflection light can be symmetrically formed in right and left directions from the effective incident area of the incident surface as a center. Illuminated areas symmetrical in right and left directions relative to the vertical line can be created. Consequently, it can be utilized for vehicles whether the vehicles travel on the right or left.

More preferably, the pair of reflective surfaces is so disposed as to be able to form a substantially horizontal cut line. Thus, it will not cause glaring against the oncoming vehicles on the opposite lane and can illuminate a distant area.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

Figure 1:
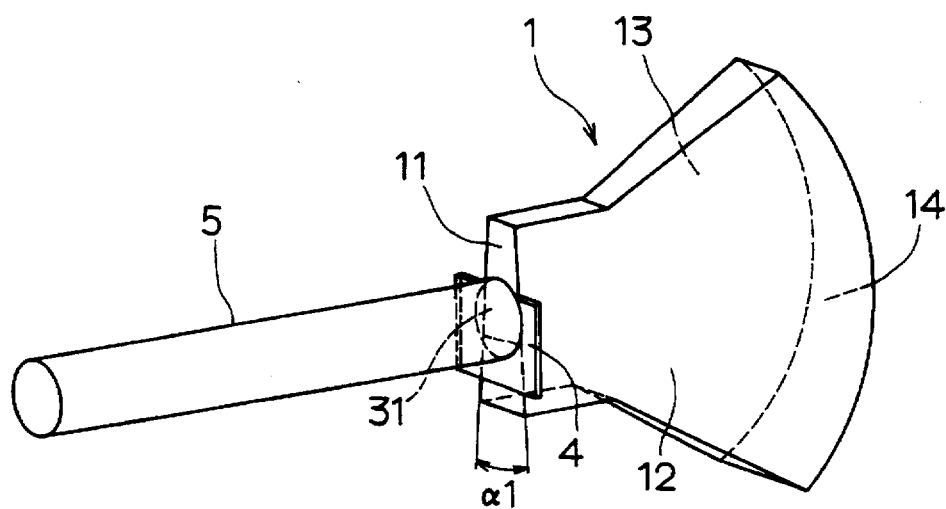
FIG. 1 is a perspective view of main parts of an auxiliary lamp (fog lamp) for a vehicle according to a first embodiment.

FIG. 1 shows a construction of main parts of an auxiliary light lamp (fog lamp) for a vehicle according to a first embodiment.

Figure 2:
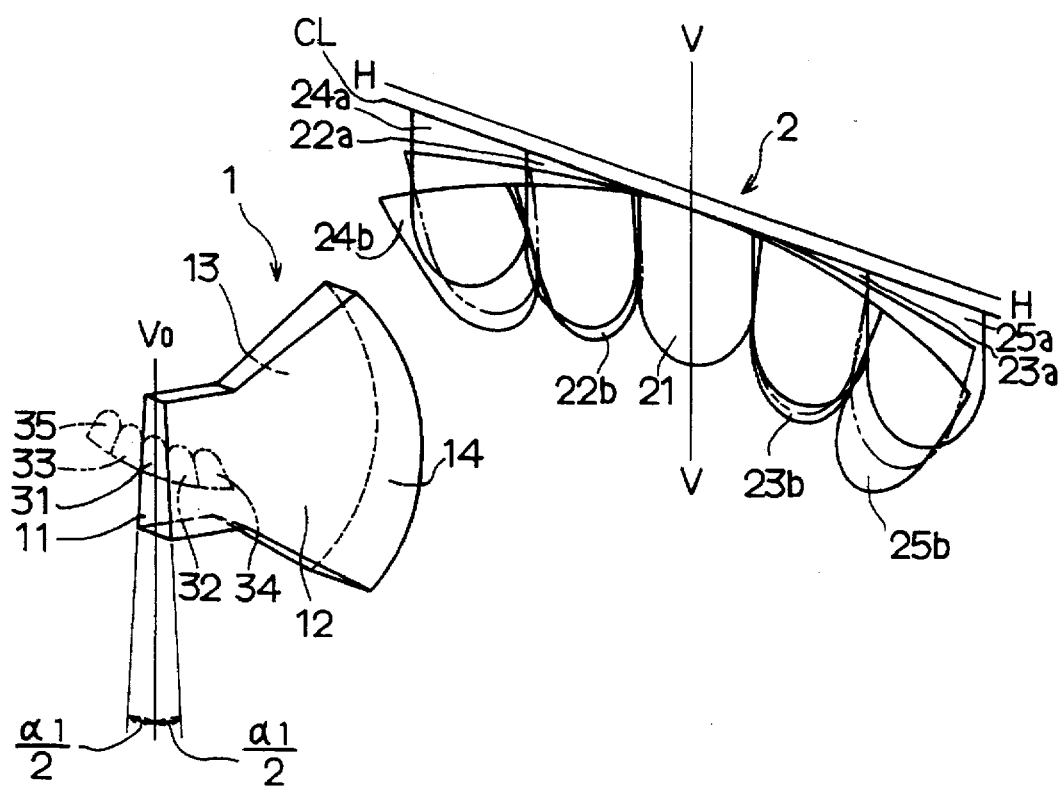
FIG. 2 is a schematic view showing virtual light incident areas of a wide angle light distribution lens used in the first embodiment and its light distribution pattern.

In FIG. 1 an auxiliary lamp for a vehicle has an optical cable 5 to guide luminous flux of a light source (not shown) to a wide angle light distribution lens 1 made of a transparent material such as glass. The wide angle light distribution lens 1 is disposed at the end of the optical cable 5 via a shade 4 to form a cut line CL (FIG. 2). The shade 4 disables the light to enter the lens 1 from the lower part of the optical cable 5.

The wide angle light distribution lens 1 is substantially fan-shaped when viewed in a horizontal direction, which comprises a light incident surface 11 where light travelling through the optical cable 5 enters, a pair of reflective surfaces 12 and 13 to totally reflect the light entering an effective light incident area 31 on the incident surface approximately once to four times, and a light outgoing surface 14 to emit the light entering the incident area 31 therefrom.

The pair of reflective surfaces 12 and 13 is not in parallel in the vertical (upward and downward) direction, and is symmetrical in the horizontal (right and left) direction relative to a vertical plane. The angle or inclination between the pair of reflective surfaces 12 and 13 is set to $\alpha_1$ in the vertical direction, so that the horizontal distance between each reflective surface widens downward. The incident surface 11 has a trapezoidal shape.

The outgoing surface 14 is substantially shaped like a part of cylindrical surface (to be more precise, it is slightly non-cylindrical surface to compensate for an aberration) so that the outgoing light can converge vertically and disperse horizontally.

In the auxiliary lamp for a vehicle of which main parts are constructed as described above, the light travelling the optical cable 5 enters the incident area 31 on the incident surface 11 of the wide angle light distribution lens 1 after being partially interrupted by the shade 4. The light entering the incident area 31 travels through the lens 1 straight to become a direct light and is reflected to become a reflection light. To be more specific, the direct light is emitted from the outgoing surface 14 after travelling straight inside the wide angle light distribution lens 1 without being reflected on the pair of reflective surfaces 12 and 13, while the reflection light is emitted from the outgoing surface 14 after being reflected approximately once to four times on either one of or both reflective surfaces 12 and 13.

As for a light distribution pattern 2 in FIG. 2, the direct light forms an illuminated area 21 on the vertical line V—V slightly below the horizontal line H—H.

Since the respective reflective surfaces 12 and 13 are inclined vertically by $\alpha_1/2$ relative to the central vertical plane or line $V_0$ as shown in FIG. 2, virtual light incident areas 32–35 of the above-described reflection light are placed on a curved line protruding downward as shown by a dots-and-chain line in FIG. 2, when the reflection light is converted to straight light. Some incident light entering the incident area 31 is reflected once on one reflective surface 12 and is emitted from the outgoing surface 14. Numeral 32 represents the virtual incident area of the reflection light reflected once by the surface 12, when this reflection light emitted from the outgoing surface 14 is converted to straight light. Some incident light entering the incident area 31 is reflected once on the other reflective surface 13 and is emitted from the outgoing surface 14. Numeral 33 represents the virtual incident area of the reflection light reflected once by the surface 13, when this reflection light emitted from the outgoing surface 14 is converted to straight light. After some incident light entering the incident area 31 is reflected once on one reflective surface 12, it is reflected again on the other reflective surface 13. Numeral 34 represents the virtual incident area of the reflection light, thus reflected twice, when this reflection light emitted from the outgoing surface 14 is converted to straight light. After some incident light entering the incident area 31 is reflected once on one reflective surface 13, it is reflected again on the other reflective surface 12. Numeral 35 represents the virtual incident area of the reflection light, thus reflected twice, when this reflection light emitted from the outgoing surface 14 is converted to straight light. Virtual light incident areas of reflection light reflected three times or more are omitted and not shown in any figures for brevity.

The distance from the virtual incident areas 32–35 to the outgoing surface 14 should be naturally longer than the designed focal distance f.

Figure 7:
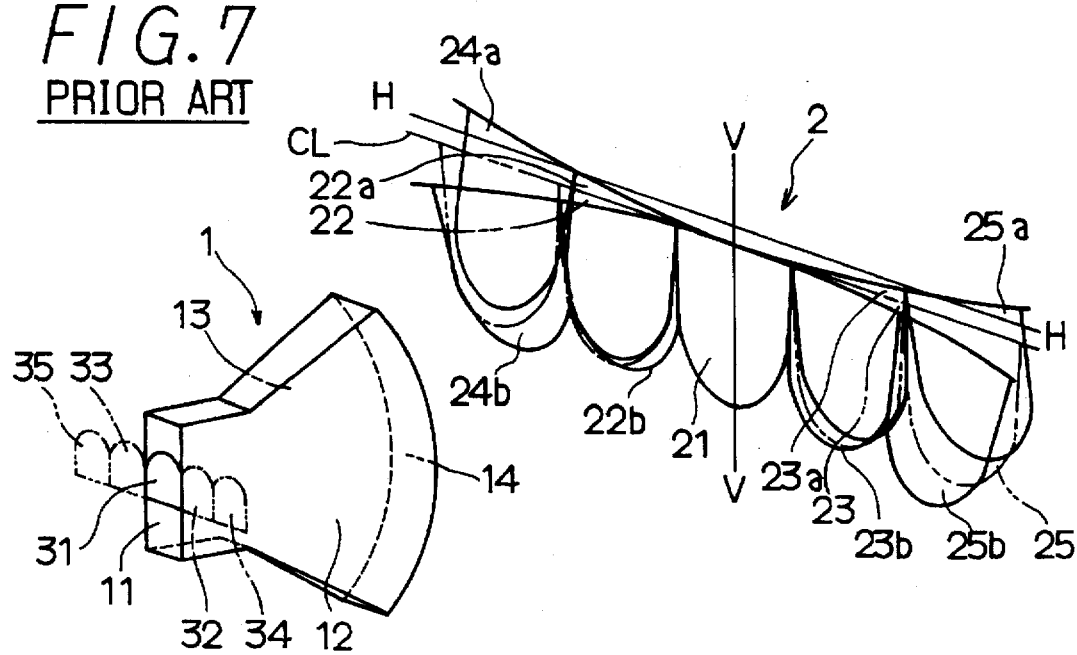
FIG. 7 is a schematic view showing the construction of a conventional wide angle light distribution lens of a vehicle illuminating device, its virtual light incident areas and its light distribution pattern.

Thus, the virtual incident areas of the reflection light 32–35 are located on the curved line protruding downward, and at the same time, the distance from the virtual incident areas 32–35 to the outgoing surface 14 becomes longer than the designed focal distance f in the same manner as in the wide angle light distribution lens 1 in FIG. 7 described above.

Figure 8A:
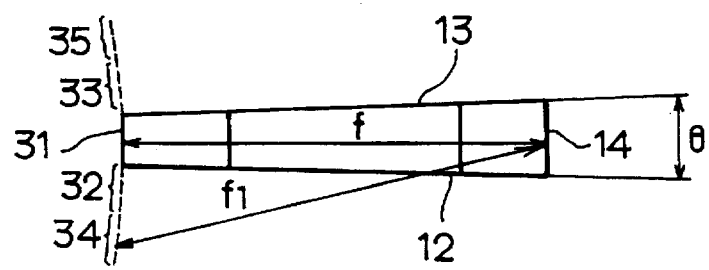
FIGS. 8A and 8B are plan views showing the lens of FIG. 7.
Figure 8B:
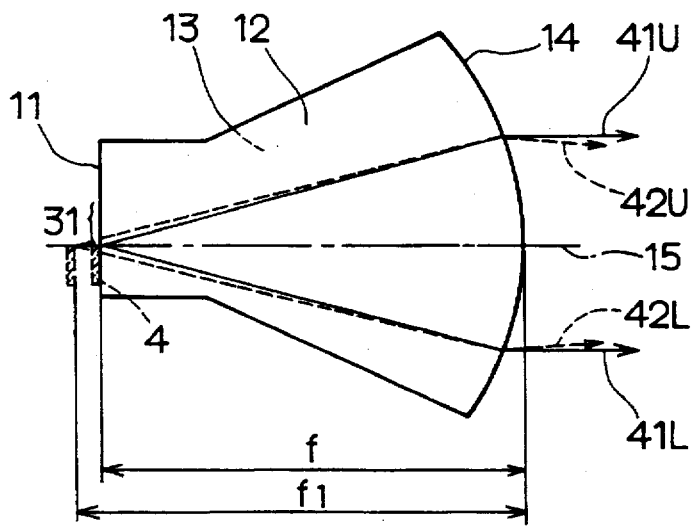

Since the distance from the virtual incident areas 32–35 to the outgoing surface 14 is longer than the designed focal distance f, the reflection light, emitted from the lower part of the outgoing surface 14 of the wide angle light distribution lens 1, tends to form an upwardly moved illuminated area in the same way as the reflection light 42L emitted from the lower part of the outgoing surface 14 below the central axis 15 of the wide angle light distribution lens 1 as shown in FIG. 8B; however, since the virtual incident areas 32–35 are located on the curved line protruding downward, both right and left portions of the upwardly moved illuminated areas are lowered. Therefore illuminated areas 22a, 23a, 24a and 25a having the substantially horizontal cut line CL are formed as shown in the light distribution pattern 2 in FIG. 2. Illuminated areas by the reflection light, emitted from the upper part of the outgoing surface 14 above the central axis 15 (FIG. 8B) of the wide angle light distribution lens 1, provide downwardly moved illuminated areas 22b, 23b, 24b and 25b, which are located much downward than conventional ones as shown in the light distribution pattern 2 in FIG. 2.

As described above, according to the auxiliary lamp for a vehicle in the first embodiment, the virtual incident areas 32–35 of the reflection light are located on the curved line protruding downward. The both right and left portions of the upwardly moved illuminated areas by the reflection light are lowered to the substantially same line as the horizontal line H—H. Thus, glaring against the on-coming vehicle traveling on the opposite lane can be prevented.

Since the pair of reflective surfaces 12 and 13 is symmetrical in right and left directions relative to the vertical plane $V_0$, the virtual incident areas 32–35 of the reflection light can be formed symmetrically relative to the incident area 31 as the center on the incident surface 11. Thus, illuminated areas symmetrical relative to the vertical line V—V can be formed. The auxiliary lamp for a vehicle can be installed on any kind of vehicles whether the vehicles travel on the left or right lane.

Since the pair of the reflective surfaces 12 and 13 is so formed as to make the cut line CL substantially horizontal, glaring against the on-coming vehicles on the opposite lane can be prevented. Furthermore, a distant area can be illuminated.

Figure 3:
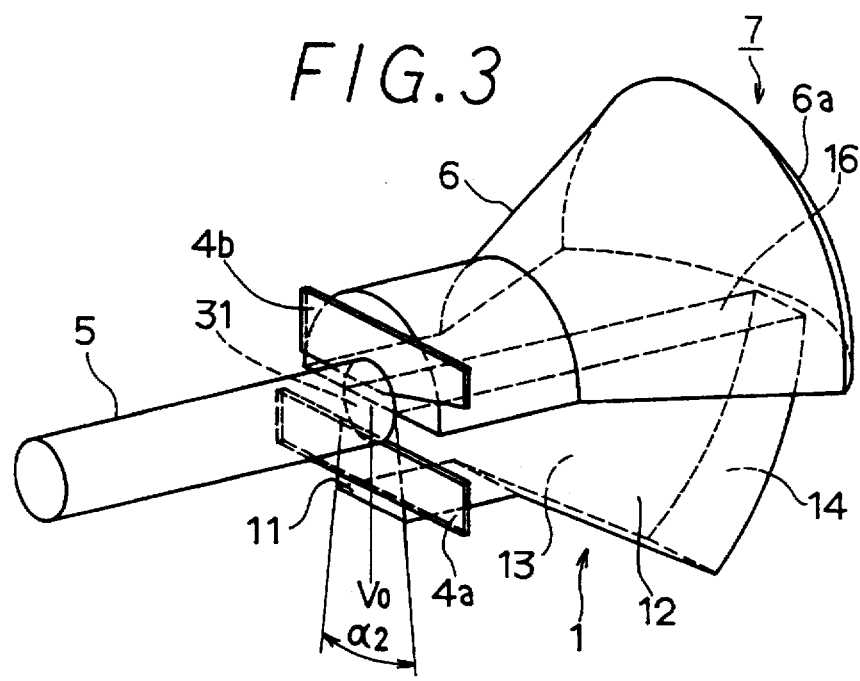
FIG. 3 is a perspective view of main parts for a headlamp (dipped-beam light) according to a second embodiment.

FIG. 3 shows the construction of main parts of a headlamp for a vehicle (dipped-beam lamp) according to the second embodiment.

In FIG. 3, a headlamp for a vehicle includes an illuminating device body 7, which is composed of the wide angle light distribution lens 1 and a hot zone forming lens 6. To be more precise, the wide angle light distribution lens 1 in FIG. 3 corresponds to the lower half of the wide angle light distribution lens 1 when the lens 1 in FIG. 1 is divided into the upper and lower halves, and the hot zone forming lens 6 having a substantially spherical-shaped light outgoing surface 6a is placed on the wide angle light distribution lens 1. The wide angle light distribution lens 1 and the hot zone forming lens 6 have different bodies respectively. The top plane 16 of the wide angle light distribution lens 1 forms a reflective surface. A shade 4b is disposed for the hot zone forming lens 6 in addition to a shade 4a for the wide angle light distribution lens 1. A pair of reflective surfaces 12 and 13 of the wide angle light distribution lens 1 is not parallel in the vertical direction in the same manner as in the wide angle light distribution lens 1 shown in FIG. 1, and is symmetrical in the right and left directions relative to the vertical plane. The angle between the pair of reflective surfaces 12 and 13 is set to $\alpha_2$ in the vertical direction, so that the space between each reflective surface can widen downward.

The light travelling the optical cable 5 is divided into incident light to the wide angle light distribution lens 1 and incident light to the hot zone forming lens 6. The incident light to the wide angle light distribution lens 1 enters the incident area 31 on the incident surface 11 of the wide angle light distribution lens 1 after being partially interrupted by the lower shade 4a. The light entering the incident area 31 becomes the direct light and reflection light. To be more specific, the direct light is emitted from the outgoing surface 14 after travelling straight inside the wide angle light distribution lens 1 without being reflected on the pair of reflective surfaces 12 and 13, while the reflection light is emitted from the outgoing surface 14 after being reflected approximately once to four times on either one of or both reflective surfaces 12 and 13, and other reflection light is emitted from the outgoing surface 14 after being reflected at least on the top plane 16

As for a light distribution pattern 2 shown in FIG. 4, the aforementioned direct light forms the illuminated area 21 on the vertical line V—V slightly below the horizontal line H—H.

Figure 4:
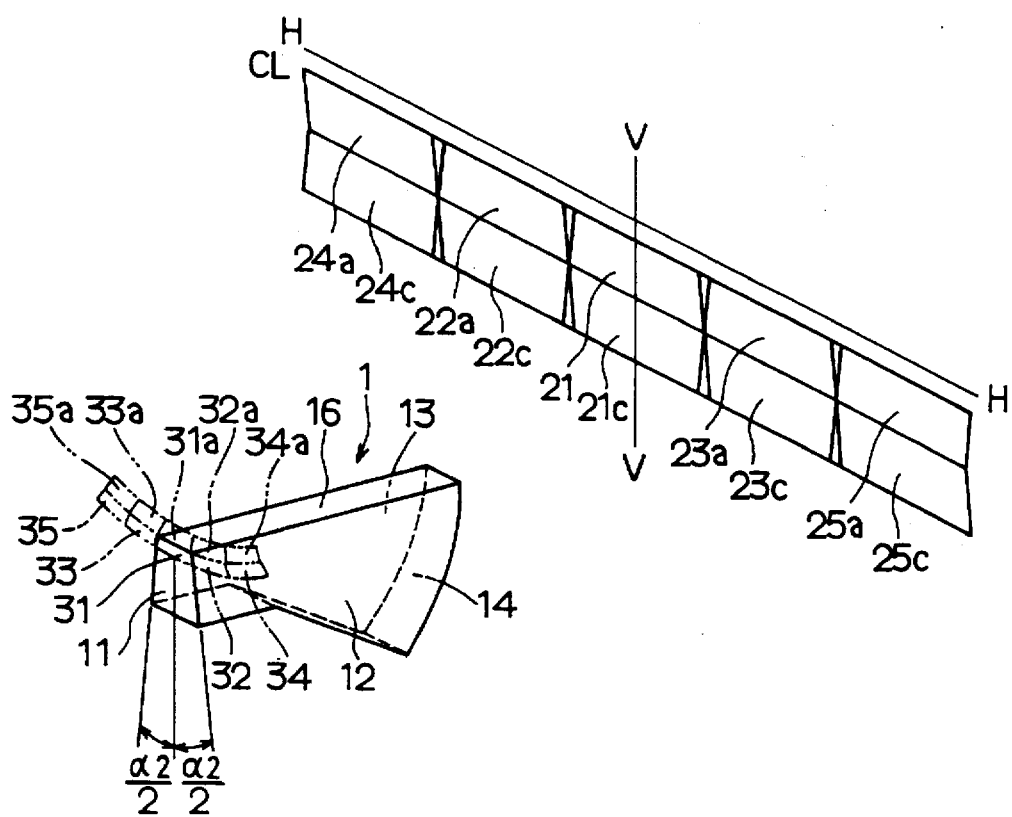
FIG. 4 is a schematic view showing virtual light incident areas of a wide angle light distribution lens used in the second embodiment and its light distribution pattern.

Since each of reflective surface 12 or 13 is inclined in the vertical direction by $\alpha_2/2$ relative to the vertical plane as shown in FIG. 4, the virtual incident areas 32–35 of the reflection light, reflected by the pair of reflective surfaces 12 and 13 described above, are located on a curved line protruding downward as shown in FIG. 4, in the same manner as in the wide angle light distribution lens 1 in FIG.

1, when the reflection light is converted to straight light. The distance from the virtual incident areas 32-35 to the outgoing surface 14 becomes longer than the designed focal distance f in the same manner as in the wide angle light distribution lens 1 in FIG. 7.

The reflection light, emitted from the outgoing surface 14 of the wide angle light distribution lens 1, tends to form an upwardly moved illuminated area in the same way as the reflection light 42L emitted from the lower part of the outgoing surface 14 of the wide angle light distribution lens 1 as shown in FIG. 8B; however, since the virtual incident areas 32-35 are located on the curved line protruding downward, both right and left portions of the upwardly moved illuminated areas are lowered. Therefore illuminated areas 2a, 23a, 24a and 25a having the substantially horizontal cut line CL are formed as shown in the light distribution pattern 2 in FIG. 4.

In the wide angle light distribution lens 1 in FIG. 3, since the top plane 16 also forms the reflective surface, as for the virtual incident areas of reflection light, a new virtual light incident area 31a of reflection light is provided on the top of the incident area 31 because the incident light is reflected on the top plane 16 as shown in FIG. 4. Furthermore, new virtual incident areas 32a, 33a, 34a and 35a of the reflection light are provided on the top of the aforementioned virtual incident areas 32-35 because the reflection light by the pair of reflective surfaces 12 and 13 described above is reflected also on the top plane 16. Therefore the new reflection light is emitted from the outgoing surface 14. As shown in FIG. 4, new illuminated areas 21c, 22c, 23c, 24c and 25c are provided below the illuminated areas 21, 22a-25a, respectively.

According to the headlamp for a vehicle in the second embodiment as explained above, the virtual incident areas 32-35 of reflection light are located on the curved line protruding downward in the same manner as in the first embodiment. The both right and left portions of the upwardly moved illuminated areas by the reflection light are lowered to the substantially same line as the horizontal line H—H. Thus, glaring against the on-coming vehicle traveling on the opposite line can be prevented. Since the pair of reflective surfaces 12 and 13 is symmetrical in right and left directions relative to the vertical plane in the same manner as in the first embodiment, illuminated areas symmetrical relative to the vertical line V—V can be formed. The headlamp for a vehicle according to the second embodiment can be installed on any kind of vehicles whether the vehicles travel on the left or right. In the same manner as in the first embodiment, since the pair of the reflective surfaces 12 and 13 is so formed as to make the cut line CL substantially horizontal, glaring against the on-coming vehicles on the opposite lane can be prevented. Furthermore, a distant area can be illuminated.

Figure 5:
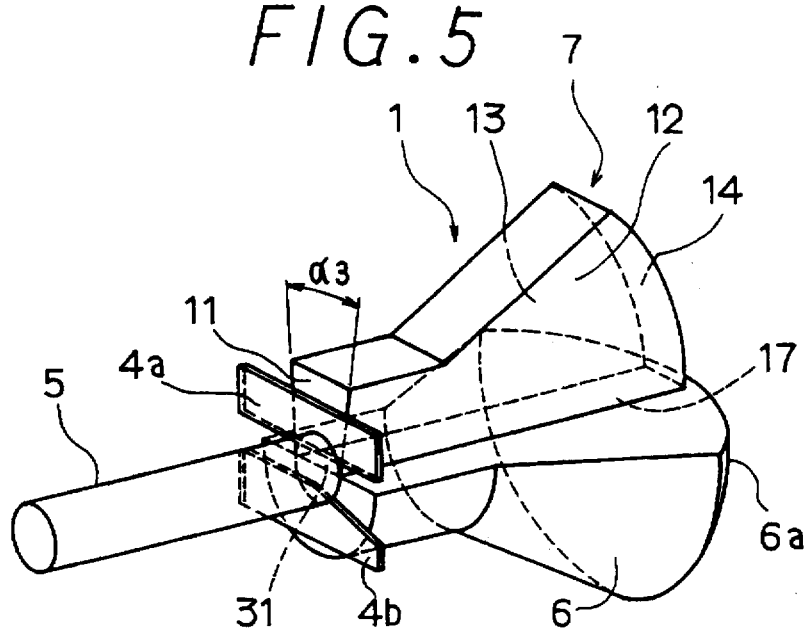
FIG. 5 is a schematic view of main parts for a headlamp (dipped-beam light) according to a third embodiment.

FIG. 5 shows the construction of main parts of a headlamp for a vehicle (dipped-beam lamp) according to the third embodiment.

In FIG. 5, the headlamp for a vehicle includes an illuminating device body 7, which is composed of the wide angle light distribution lens 1 and a hot zone forming lens 6. To be more precise, the wide angle light distribution lens 1 in FIG. 5 corresponds to the inverted lower half of the wide angle light distribution lens 1 when the lens 1 in FIG. 1 is divided into the upper and lower halves, and the hot zone forming lens 6 having a substantially spherical-shaped light outgoing surface 6a is placed under the wide angle light distribution lens 1. The wide angle light distribution lens 1 and the hot zone forming lens 6 have different bodies respectively. The bottom plane 17 of the wide angle light distribution lens 1 forms a reflective surface. A shade 4b is disposed for the hot zone forming lens 6 in addition to a shade 4a for the wide angle light distribution lens 1 in the same manner as in the illuminating device body 7 in FIG. 3 A pair of reflective surfaces 12 and 13 of the wide angle light distribution lens 1 is not parallel in the vertical direction in the same manner as in the wide angle light distribution lens 1 shown in FIG. 1, and is symmetrical in the right and left directions relative to the vertical plane. The angle between the pair of reflective surfaces 12 and 13 is set to $\alpha_3$ in the vertical direction, so that the space between each reflective surface can widen upward.

The light travelling the optical cable 5 is divided into incident light to the wide angle light distribution lens 1 and incident light to the hot zone forming lens 6. The incident light to the wide angle light distribution lens 1 enters the incident area 31 on the incident surface 11 of the wide angle light distribution lens 1 after being partially interrupted by the upper shade 4a. The light entering the incident area 31 becomes the direct light and reflection light. To be more specific, the direct light is emitted from the outgoing surface 14 after travelling straight inside the wide angle light distribution lens 1 without being reflected on the pair of reflective surfaces 12 and 13, while the reflection light is emitted from the outgoing surface 14 after being reflected approximately once to four times on either one of or both reflective surfaces 12 and 13, and other reflection light is emitted from the outgoing surface 14 after being reflected at least on the bottom plane 17.

As for a light distribution pattern 2 shown in FIG. 6, the aforementioned direct light forms the illuminated area 21 on the vertical line V—V slightly below the horizontal line H—H.

Figure 6:
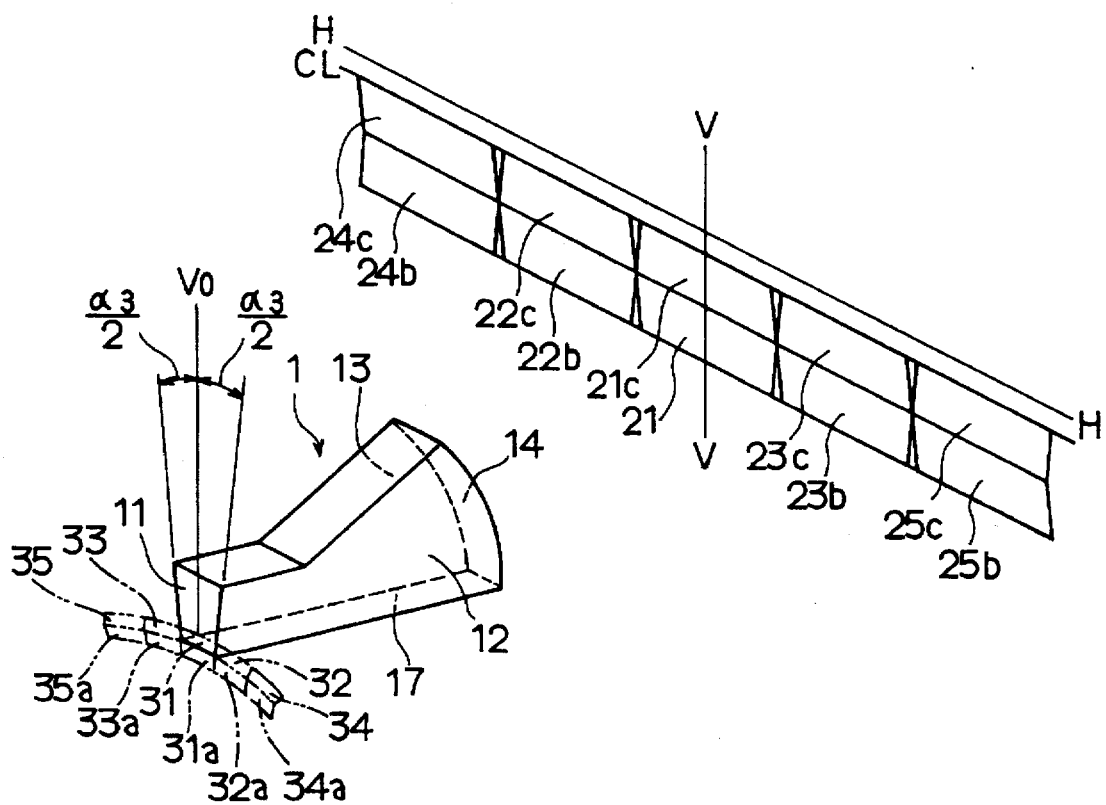
FIG. 6 is a schematic view showing virtual light incident areas of a wide angle light distribution lens used in the third embodiment and its light distribution pattern.

Since each of reflective surface 12 and 13 is inclined in the vertical direction by $\alpha_3/2$ relative to the vertical plane as shown in FIG. 6, the virtual incident areas 32-35 of the reflection light, reflected by the pair of reflective surfaces 12 and 13 described above, are located on a curved line protruding upward as shown in FIG. 6 when the reflection light is converted to straight light. The distance from the virtual incident areas 32-35 to the outgoing surface 14 becomes longer than the designed focal distance f in the same manner as in the wide angle light distribution lens 1 in FIG. 7.

The reflection light, emitted from the outgoing surface 14 of the wide angle light distribution lens 1, tends to form a downwardly moved illuminated area in the same way as the reflection light 42U emitted from the upper part of the outgoing surface 14 of the wide angle light distribution lens 1 as shown in FIG. 8B; however, since the virtual incident areas 32-35 are located on the curved line protruding upward, both right and left portions of the downwardly moved illuminated areas are raised. Therefore substantially horizontal illuminated areas 22a, 23a, 24a and 25a are formed as shown in the light distribution pattern 2 in FIG. 6.

In the wide angle light distribution lens 1 in FIG. 5, since the bottom plane 17 also forms the reflective surface, as for the virtual incident areas of reflection light, a new virtual light incident area 31a of reflection light is provided under the incident area 31 because the incident light is reflected on the bottom plane 17 as shown in FIG. 6. Furthermore, new virtual incident areas 32a, 33a, 34a and 35a of the reflection light are provided under the virtual incident areas 32-35, respectively because the reflection light by the pair of reflective surfaces 12 and 13 described above is reflected on the bottom plane 17. Therefore the new reflection light is emitted from the outgoing surface 14. As shown in FIG. 6, new illuminated areas 21c, 22c, 23c, 24c and 25c are provided on the illuminated areas 21, 22b–25b, respectively. The illuminated areas 21c, 22c, 23c, 24c, and 25c form the substantially horizontal cut line CL.

According to the headlamp for a vehicle in the third embodiment as explained above, the virtual incident areas 32–35 of reflection light are located on the curved line protruding upward. The both right and left portions of the downwardly moved illuminated areas by the reflection light are raised to make the cut line CL close to the horizontal line H—H. Since the pair of reflective surfaces 12 and 13 is symmetrical in right and left directions relative to the vertical plane in the same manner as in the first and second embodiments, illuminated areas symmetrical relative to the vertical line V—V can be formed. The headlamp for a vehicle according to the third embodiment can be installed on any kind of vehicles whether the vehicles travel on the left or right. In the same manner as in the first and second embodiments, since the pair of the reflective surfaces 12 and 13 is so formed as to make the cut line CL substantially horizontal, glaring against on-coming vehicles on the opposite lane can be prevented. Furthermore, a distant area can be illuminated.

The pair of reflective surfaces 12 and 13 of the wide angle light distribution lens 1 in the above-described each embodiment is symmetrically disposed relative to the vertical plane; however, even if either one of the reflective surfaces is disposed on a non-vertical plane, either one of right or left portion of illuminated areas can be formed closer to the horizontal line. Consequently, such illuminating device for a vehicle can be installed on a vehicle which travels exclusively on either the right or left lane. The aforementioned preferred embodiments explain the cases when the present invention is adopted as an illuminating device for an automobile; however, the present invention can be adopted to an illuminating device for a ship, an aircraft, a fixed place or even for a portable lamp.

The present invention should not be limited to the above-described embodiments but may be modified in many other ways without departing from the spirit of the invention.

What is claimed is:

1. An illuminating device comprising:

light source means, and a lens body connected to said light source means and passing light from said light source means therethrough to provide a flat light distribution pattern, wherein;

said lens body has a central axis and is made of a light transmitting material;

said lens body is formed with a light incident surface and a light outgoing surface;

said lens body is formed with a pair of reflective surfaces facing each other between said incident surface and said outgoing surface;

said pair of said reflective surfaces functioning to project a part of said light as reflection light on both sides of another part of said light which reaches said outgoing surface directly as direct light from said incident surface; and the reflective surfaces of said pair being inclined with respect to each other so that each of said reflective surfaces intersects a sectional plane crossing said central axis of said lens body at right angles, at respective lines inclined to each other, wherein the flat light distribution pattern is formed by a combination of the direct light and the reflection light reflected at different times.

2. An illuminating device according to claim 1, wherein:

said reflective surfaces of said pair are symmetrical with respect to a vertical plane comprising said central axis.

3. An illuminating device according to claim 2, wherein:

said pair of said reflective surfaces is formed to extend downwardly at a predetermined angle at least under said central axis of said lens body.

4. An illuminating device according to claim 3, wherein:

said angle of said pair of said reflective surfaces is set for making a top of a light distribution pattern provided by said lens body straight.

5. An illuminating device according to claim 2, wherein:

said pair of said reflective surfaces is formed to extend upwardly at a predetermined angle above said central axis of said lens body.

6. An illuminating device according to claim 5, wherein:

said angle of said pair of said reflective surfaces is set for making a top of a light distribution pattern provided by said lens body straight.

7. An illuminating device comprising:

light source means, and a lens body connected to said light source means and passing light from said light source means therethrough to provide a flat light distribution pattern, wherein;

said lens body has a central axis and is made of a light transmitting material;

said lens body is formed with alight incident surface and alight outgoing surface;

said lens body is formed with a pair of reflective surfaces facing each other between said incident surface and said outgoing surface;

said pair of said reflective surfaces functioning to project a part of said light as reflection light on both sides of another part of said light which reaches said outgoing surface directly as direct light from said incident surface; and the reflective surfaces of said pair being inclined with respect to each other so that each of said reflective surfaces intersects a sectional plane crossing said central axis of said lens body at right angles, at respective lines inclined to each other, another lens body which provides a hot zone light distribution pattern, wherein:

said lens body and said another lens body are vertically coupled together.

8. An illuminating device according to claim 7, wherein:

said light source means includes an optical fiber conducting said light therethrough;

said light from said optical fiber is supplied to both of said lens body and said another lens body.

9. An illuminating device comprising:

a lens body having a central axis and made of a light transmitting material and mounted on a vehicle as a headlamp for projecting light incident thereto;

said lens body having a light incident surface and an outgoing surface formed on an outer surface thereof;

said lens body having a pair of reflective surfaces formed to face each other between said incident surface and said outgoing surface;

said pair of said reflective surfaces functioning to project a part of said light as reflection light on both sides of another part of said light which reaches said outgoing surface directly as direct light from said incident surface; and the reflective surfaces forming a predetermined angle on a sectional surface crossing said central axis of said lens body at right angles, for adjusting a position of said reflection light relative to said direct light, wherein the flat light distribution pattern is formed by a combination of the direct light and the reflection light reflected at different times.

10. An illuminating device comprising:

a lens body having a central axis and made of a light transmitting material and mounted on a vehicle as a headlamp for projecting light incident thereto;

said lens body having a light incident surface and an outgoing surface formed on an outer surface thereof;

said lens body having a pair of reflective surfaces formed to face each other between said incident surface and said outgoing surface;

said pair of said reflective surfaces functioning to project a part of said light as reflection light on both sides of another part of said light which reaches said outgoing surface directly as direct light from said incident surface; and the reflective surfaces forming a predetermined angle on a sectional surface crossing said central axis of said lens body at right angles, for adjusting a position of said reflection light relative to said direct light, wherein:

said angle of said pair of said reflective surfaces is so set that said direct light and said reflection light form a substantially straight cut line which defines an uppermost portion of an illumination pattern.

11. An illuminating device according to claim 10, wherein:

a distance between said pair of said reflective surfaces increases upward above said central axis of said lens body.

12. An illuminating device according to claim 11, further comprising:

another lens body disposed below said lens body, wherein said light is separately distributed by both of said lens bodies.

13. An illuminating device according to claim 10, wherein:

a distance between said pair of said reflective surfaces increases downward below said central axis of said lens body.

14. A headlamp for a vehicle according to claim 13, further comprising:

another lens body disposed above said lens body, wherein said light is separately distributed by both of lens bodies.

15. An illuminating device comprising:

light source means, and a lens body connected to said light source means and passing light from said light source means therethrough to provide a flat light distribution pattern, wherein:

said lens body has a central axis and is made of a light transmitting material;

said lens body is formed with a light incident surface and a curved light outgoing surface;

said lens body is formed with a pair of flat reflective surfaces facing each other between said incident surface and said outgoing surface and arranged perpendicularly to said flat light distribution pattern;

said lens body projecting said light from said outgoing surface as a combination of light passing without reflection and light reflected at different times by said reflective surfaces;

said reflective surfaces being inclined to each other on a sectional plane crossing said central axis of said lens body at right angles; and said reflective surfaces are symmetrical relative to a vertical plane comprising said central axis.

* * * * *